United States Patent
Tanaka

(10) Patent No.: US 8,918,659 B2
(45) Date of Patent: Dec. 23, 2014

(54) CONTROL DEVICE, IMAGE FORMING APPARATUS, AND CONTROL METHOD

(75) Inventor: Satoshi Tanaka, Ohta-ku (JP)

(73) Assignee: Ricoh Company, Limited, Tokyo (JP)

( * ) Notice: Subject to any disclaimer, the term of this patent is extended or adjusted under 35 U.S.C. 154(b) by 497 days.

(21) Appl. No.: 13/326,479

(22) Filed: Dec. 15, 2011

(65) Prior Publication Data
US 2012/0173896 A1 Jul. 5, 2012

(30) Foreign Application Priority Data

Jan. 4, 2011 (JP) ................................ 2011-000194

(51) Int. Cl.
*G06F 1/32* (2006.01)
*H04N 1/32* (2006.01)
*G03G 15/00* (2006.01)
*H04N 1/00* (2006.01)

(52) U.S. Cl.
CPC ........ *G03G 15/5004* (2013.01); *H04N 1/00217* (2013.01); *H04N 2201/0036* (2013.01); *H04N 2201/0094* (2013.01); *H04N 1/32593* (2013.01); *H04N 1/00904* (2013.01); *H04N 1/00896* (2013.01); *H04N 1/00928* (2013.01); *H04N 2201/0039* (2013.01)
USPC ........... 713/300; 713/320; 713/322; 713/323; 713/324; 709/223; 709/227; 709/250

(58) Field of Classification Search
USPC .......... 713/300, 320, 322, 323, 324; 709/223, 709/227, 250
See application file for complete search history.

(56) References Cited

U.S. PATENT DOCUMENTS

| 7,283,262 | B2 | 10/2007 | Takeda et al. |
| 7,755,779 | B2* | 7/2010 | Miura et al. ................ 358/1.13 |
| 7,868,649 | B2 | 1/2011 | Tanaka |
| 7,873,295 | B2* | 1/2011 | Yamaguchi .................... 399/88 |

(Continued)

FOREIGN PATENT DOCUMENTS

| CN | 1480820 | 3/2004 |
| CN | 1260633 C | 6/2006 |

(Continued)

OTHER PUBLICATIONS

Chinese Office Action and English translation thereof dated Feb. 8, 2014.

(Continued)

*Primary Examiner* — M Elamin
(74) *Attorney, Agent, or Firm* — Harness, Dickey & Pierce, P.L.C.

(57) ABSTRACT

A power supply circuit receives power from a power supply and supplies the power to loads including a main controller and a first sub-controller performing response action through a network when the supply of power to the main controller is blocked and the image forming apparatus is connected to the network. A second sub-controller controls the blocking of the supply of power to the main controller. The sub-controller determines whether to block the supply of power to the main controller, determines a connection state of the image forming apparatus to the network when the first determination unit determines to block the supply of power, blocks the supply of power to the first sub-control unit according to the determination result, and detects a factor for resuming the supply of power to the main controller and a factor for blocking the supply of power to all or a part of the loads.

8 Claims, 4 Drawing Sheets

(56) References Cited

U.S. PATENT DOCUMENTS

| | | |
|---|---|---|
| 7,992,019 B2 * | 8/2011 | Kawaji .......................... 713/320 |
| 8,089,645 B2 * | 1/2012 | Soda ............................. 358/1.14 |
| 8,213,811 B2 * | 7/2012 | Takatani ........................... 399/8 |
| 8,270,328 B2 | 9/2012 | Tsuzuki |
| 8,635,479 B2 * | 1/2014 | Soga .............................. 713/323 |
| 2007/0014586 A1 * | 1/2007 | Kobayashi ....................... 399/70 |
| 2009/0077292 A1 | 3/2009 | Tanaka |
| 2010/0332879 A1 * | 12/2010 | Nakata .......................... 713/323 |
| 2011/0004776 A1 | 1/2011 | Tanaka |

FOREIGN PATENT DOCUMENTS

| | | |
|---|---|---|
| CN | 101854246 | 10/2010 |
| JP | 2001-236146 | 8/2001 |
| JP | 2009187134 A | 8/2009 |
| JP | 4440326 B2 | 1/2010 |

OTHER PUBLICATIONS

Japanese patent publication JP-2009-153192.

* cited by examiner

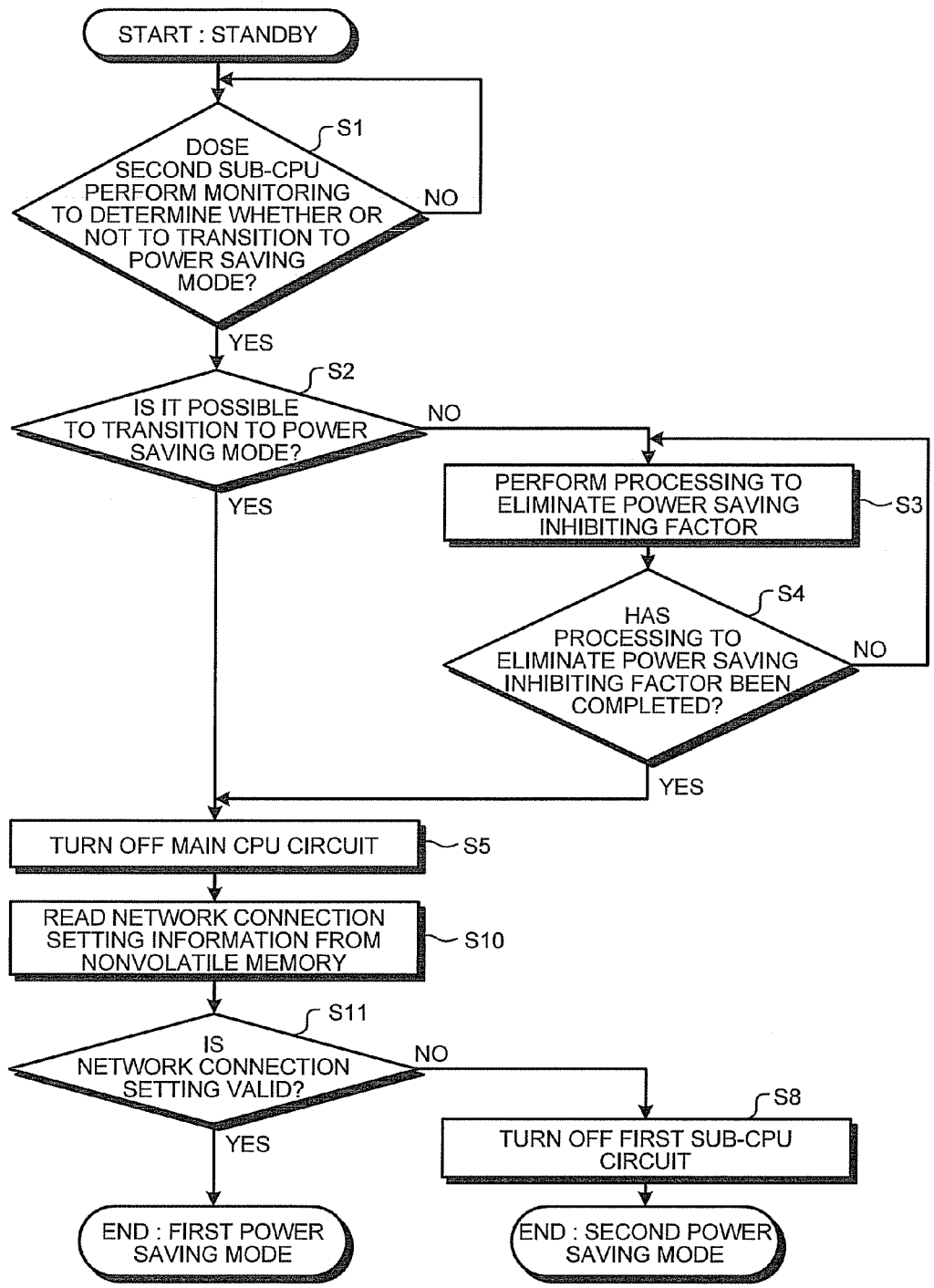

CONTROL DEVICE, IMAGE FORMING APPARATUS, AND CONTROL METHOD

CROSS-REFERENCE TO RELATED APPLICATIONS

The present application claims priority to and incorporates by reference the entire contents of Japanese Patent Application No. 2011-000194 filed in Japan on Jan. 4, 2011.

BACKGROUND OF THE INVENTION

1. Field of the Invention

The present invention relates to a control device, an image forming apparatus, and a control method.

2. Description of the Related Art

In image forming apparatuses such as a multifunction printer (MFP) and a laser printer (LP), the supply of power to respective loads, which are units included in the image forming apparatus, is controlled to thereby control driving of the respective units. Among such image forming apparatuses, there is an image forming apparatus in which when a power saving mode in which power consumption is suppressed is set, the supply of power to a main central processing unit (CPU) which controls the entire image forming apparatus is stopped in order to suppress power consumption while the power is supplied only to a unit for detecting a specific factor (referred to as a return factor) that the image forming apparatus uses to return a different operation mode from the power saving mode. Then, when the return factor is detected, the image forming apparatus returns to a normal mode from the power saving mode so that the supply of power to the respective units is initiated. However, in many cases, image forming apparatuses are under a network environment in which the image forming apparatuses are connected to a network. Among such image forming apparatuses, there is an image forming apparatus which includes a sub-CPU that consumes less power than a main CPU. In that image forming apparatus, the sub-CPU performs response actions under the network environment in place of the main CPU even when a power saving mode is set, and when the supply of power to the main CPU is stopped. In recent years, techniques have been developed which decrease unnecessary power consumption in regard to response actions under the network environment when an operation mode of an image forming apparatus located under a network environment is set to a power saving mode (for example, see Japanese Patent No. 4440326).

However, in the technique disclosed in Japanese Patent No. 4440326, when an operation mode of an image forming apparatus which is in a stand-alone state in which the image forming apparatus is not connected to a network is set to a power saving mode, power is supplied to a unit that performs response actions even if the unit does not need to perform response actions which are necessary under the network environment. As a result, power is consumed unnecessarily.

There is a need to reduce power consumption of an image forming apparatus more effectively.

SUMMARY OF THE INVENTION

It is an object of the present invention to at least partially solve the problems in the conventional technology.

A control device includes a power supply circuit and a second sub-control unit. The power supply circuit receives power from a power supply and supplies the power to a plurality of loads. The loads includes at least a main control unit that controls a main body of an image forming apparatus and a first sub-control unit that performs response action through a network when the supply of power to the main control unit is blocked and the image forming apparatus is connected to the network. The second sub-control unit controls the blocking of the supply of power to the main control unit. The sub control unit includes a first determination unit that determines whether or not to block the supply of power from the power supply circuit to the main control unit using a predetermined condition; a second determination unit that determines a state of the image forming apparatus with regard to connection to the network when the first determination unit determines to block the supply of power from the power supply circuit to the main control unit; a power control unit that blocks the supply of power from the power supply circuit to the first sub-control unit in accordance with the determination result by the second determination unit; and a detection unit that detects at least one of a factor for resuming the supply of power from the power supply circuit to the main control unit and a factor for blocking the supply of power from the power supply circuit to all or a part of the loads of the image forming apparatus.

An image forming apparatus includes a main control unit, a first sub-control unit, an image forming unit, a power supply circuit, and a second sub-control unit. The main control unit controls a main body of the image forming apparatus. The first sub-control unit performs response action through a network when the supply of power to the main control unit is blocked and the image forming apparatus is connected to the network. The image forming unit forms an image on a print medium using image data representing an image. The power supply circuit receives power from a power supply and supplies the power to a plurality of loads including at least the main control unit, the first sub-control unit, and the image forming unit. The second sub-control unit controls the blocking of the supply of power to the main control unit. The second sub-control unit includes a first determination unit that determines whether or not to block the supply of power from the power supply circuit to the main control unit using predetermined conditions; a second determination unit that determines a state of the image forming apparatus in regard to connection to the network when the first determination unit determines to block the supply of power from the power supply circuit to the main control unit; a power control unit that blocks the supply of power from the power supply circuit to the first sub-control unit in accordance with the determination result by the second determination unit; and a detection unit that detects at least one of a factor for resuming the supply of power from the power supply circuit to the main control unit and a factor for blocking the supply of power from the power supply circuit to all or a part of the loads of the image forming apparatus.

A control method is executed by a control device that includes a power supply circuit and a second sub-control unit. The power supply circuit receives power from a power supply and supplies power to a plurality of loads. The loads includes at least a main control unit that controls a main body of an image forming apparatus and a first sub-control unit that performs response action through a network when the supply of power to the main control unit is blocked, and the image forming apparatus is connected to the network. The second sub-control unit controls the blocking of the supply of power to the main control unit. The control method includes determining, by the second-sub control unit, whether or not to block the supply of power from the power supply circuit to the main control unit using predetermined conditions; determining, by the second-sub control unit, a state of the image forming apparatus with regard to connection to the network when it is determined to block the supply of power from the power supply circuit to the main control unit, in the determining of whether or not to block the supply; by the second sub-control unit, blocking, the supply of power from the power supply circuit to the first sub-control unit in accordance with the determination result in the determining the state of the image forming apparatus; and detecting, by the second sub-control unit, at least one of a factor for resuming the supply of power from the power supply circuit to the main control unit and a factor for blocking the supply of power from the power supply circuit to all or a part of the loads of the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating the flow of processes performed by the second sub-CPU according to a modified example when the operation mode of the image forming apparatus transitions from a standby mode to a first power saving mode or a second power saving mode.

DETAILED DESCRIPTION OF THE PREFERRED EMBODIMENTS

Hereinafter, a control device, an image forming apparatus, a control method, and a control program according to an embodiment of the present invention will be described in detail with reference to the accompanying drawings.

Figure 1:
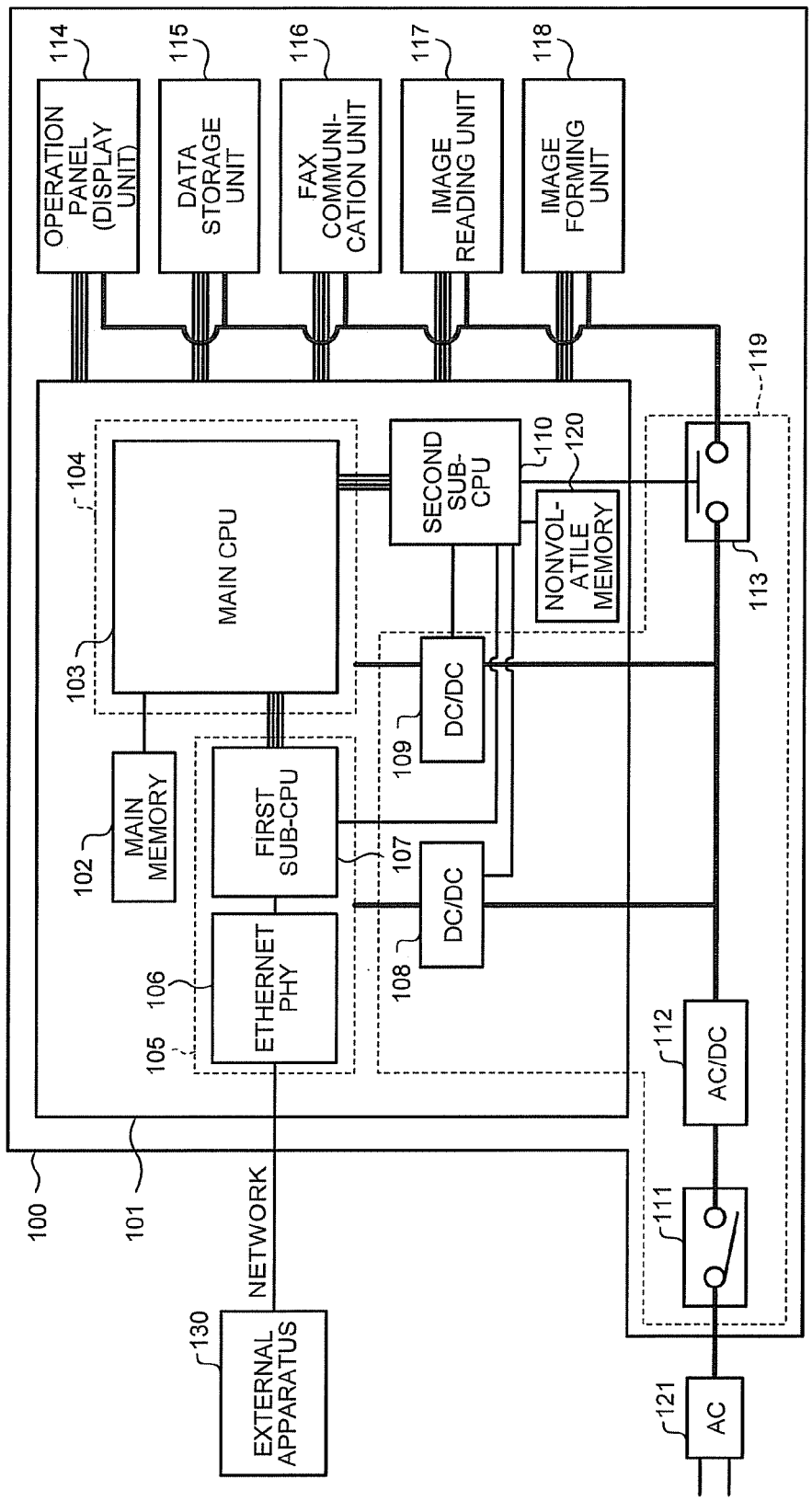
FIG. 1 is a diagram illustrating the configuration of an image forming apparatus according to an embodiment.

The configuration of an image forming apparatus including a control device will be described with reference to FIG. 1. An image forming apparatus 100 includes a power supply device 119, a controller 101, an operation panel 114, a data storage unit 115, a facsimile (FAX) communication unit 116, an image reading unit 117, and an image forming unit 118. The above devices excluding the power supply device 119 are loads that are supplied with power from the power supply device 119. The controller 101 includes a main memory 102, a main central processing unit (CPU) circuit 104, a sub-CPU peripheral circuit 105, a second sub-CPU 110, and a nonvolatile memory 120. The controller 101 is connected to an external apparatus 130 such as a personal computer (PC) through a network. The network may be a local area network (LAN), an intranet, the Ethernet (registered trademark), or the Internet, for example. In this example, the network is the Ethernet (registered trademark). Although not shown in the drawing, connectors to which network cables for realizing connection to a network are connected are arranged in the image forming apparatus 100. The main CPU circuit 104 includes a main CPU 103. The sub-CPU peripheral circuit 105 includes an Ethernet physical layer (Ethernet (registered trademark) PHY) 106 and a first sub-CPU 107. The power supply device 119 includes direct current (DC)/DC power supply circuits 108 and 109, a master power switch (Locker SW) 111, an alternate current (AC)/DC power generation unit 112, a main unit power switch 113. The power supply device 119 and the second sub-CPU 110 correspond to the control device.

The main memory 102 is a read only memory (ROM) or a random access memory (RAM), for example, and stores therein various types of data or various kinds of programs. The data storage unit 115 is a hard disk drive (HDD), a NAND-type flash memory, a nonvolatile memory such as a NVRAM, for example, and stores therein various types of data or various kinds of programs. The main CPU 103 executes various kinds of programs stored in the main memory 102 or the data storage unit 115 to thereby control the entire image forming apparatus 100. In the operation panel 114, a display unit for displaying information is integrated with an operation input unit such as a keyboard and a mouse for receiving operation inputs of a user. As shown in FIG. 1, although power is supplied to the display unit of the operation panel 114 through the main unit power switch 113, power is supplied to the operation input unit of the operation panel 114 through a different power supply path (not shown). The FAX communication unit 116 performs FAX communication with an external apparatus (not shown). The image reading unit 117 is a scanner, for example, and reads images formed on a document. The image forming unit 118 includes a monochrome plotter, a 1-drum color plotter or a 4-drum color plotter, and an application specific integrated circuit (ASIC), for example. The image forming unit 118 performs various kinds of image processing such as error diffusion or gamma conversion on image data representing images read by the image reading unit 117 or image data received from an external apparatus such as the external apparatus 130 and performs printing by forming images on a print medium such as a sheet using the processed image data.

The second sub-CPU 110 controls the entire image forming apparatus 100 or a part thereof by executing various kinds of programs stored in the main memory 102 or the data storage unit 115 in place of the main CPU 103 when supply of power to the main CPU 103 is blocked. Moreover, the second sub-CPU 110 has a clock function of counting time. In this embodiment, in particular, the second sub-CPU 110 determines periodically or at an optional point in time whether or not to transition the operation mode of the image forming apparatus 100 to a power saving mode from a standby mode. The second sub-CPU 110 controls the blocking of the supply of power from the AC/DC power generation unit 112 to the main CPU circuit 104 including the main CPU 103 in accordance with the determination result. Moreover, the second sub-CPU 110 causes the first sub-CPU 107 to be described later to check the state of the image forming apparatus 100 with regard to connection to a network when causing the operation mode to transition from the standby mode to the power saving mode. Furthermore, the second sub-CPU 110 monitors a factor (referred to as a return factor) for returning to a different operation mode from the power saving mode when the operation mode has transitioned from the standby mode to the power saving mode. When the return factor is detected, the second sub-CPU 110 causes the image forming apparatus 100 to transition from the power saving mode to a different operation mode in accordance with the detected return factor. The return factor is at least one of the factors for returning the supply of power to the main CPU circuit 104 and the factors for blocking the supply of power to all loads of the image forming apparatus 100. Details of various kinds of operation modes and the return factor will be described later. Such a second sub-CPU 110 consumes much less power than the main CPU 103. The nonvolatile memory 120 stores therein various kinds of setting information.

The Ethernet physical layer 106 controls communication in a network such as the Ethernet, for example. The first sub-CPU 107 includes a MAC (logical layer) and plays a role of connecting the image forming apparatus 100 to a network. Moreover, the first sub-CPU 107 detects whether the Ethernet physical layer 106 is linked to a network under the control of the second sub-CPU 110 when the operation mode of the image forming apparatus 100 transitions from the standby mode to the power saving mode. Specifically, the detection is realized by checking the state of a link status register of the Ethernet physical layer 106. Based on the detection result, the second sub-CPU 110 can determine whether the image forming apparatus 100 is connected to a network or not as the state of the image forming apparatus 100 with regard to connection to a network. Moreover, the first sub-CPU 107 performs automatic response actions through the network in place of the main CPU 103 when the operation mode of the image forming apparatus 100 transitions to a first power saving mode.

The master power switch 111 switches between supply of power from an AC power supply 121 and blocking thereof by being turned on and off in accordance with a switching operation. The AC/DC power generation unit 112 functions as a power supply unit (PSU) and converts an alternate-current voltage (AC power) as power supplied from the AC power supply 121 into a direct-current voltage (DC power). The AC/DC power generation unit 112 supplies the DC power to the sub-CPU peripheral circuit 105 through the DC/DC power supply circuit 108 and supplies the DC power to the main CPU circuit 104 through the DC/DC power supply circuit 109. Moreover, the AC/DC power generation unit 112 supplies the DC power to the display unit of the operation panel 114, the data storage unit 115, the FAX communication unit 116, the image reading unit 117, and the image forming unit 118 through the main unit power switch 113.

The DC/DC power supply circuit 108 appropriately transforms the DC power converted by the AC/DC power generation unit 112 and supplies the transformed power to the sub-CPU peripheral circuit 105. The DC/DC power supply circuit 109 appropriately transforms the DC power converted by the AC/DC power generation unit 112 and supplies the transformed power to the main CPU circuit 104. The main power switch 113 is turned on and off in accordance with the operation mode set in the image forming apparatus 100 under the control of the second sub-CPU 110.

Figure 2:
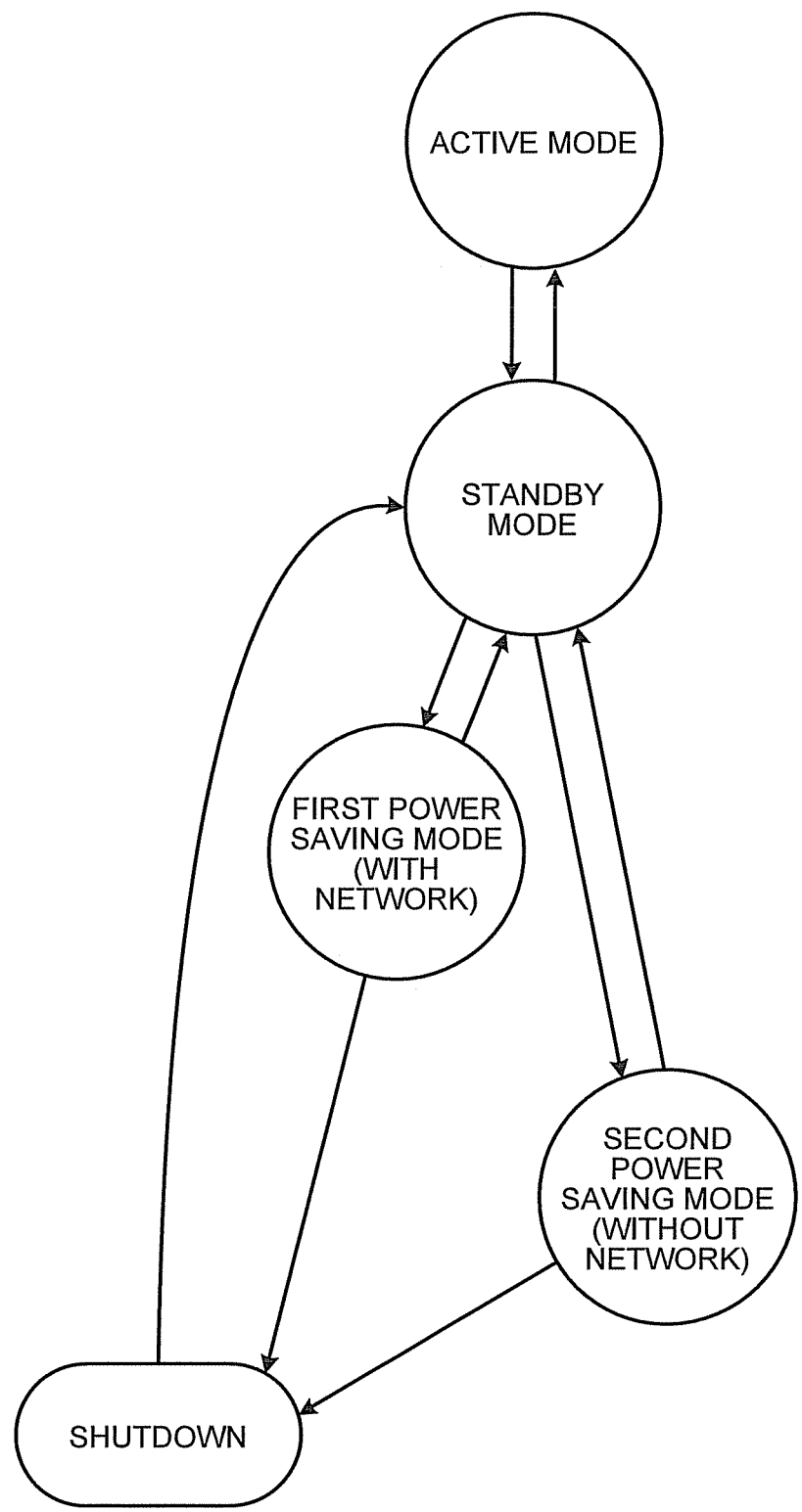
FIG. 2 is a diagram illustrating transition of operation modes of the image forming apparatus.

The image forming apparatus 100 having the above configuration transitions to any one of a plurality of different operation modes in accordance with the state of power supplied to the respective loads described above. Transition to respective operation modes depends on the turning on and off of the master power switch 111, the operation inputs through the operation input unit of the operation panel 114, and the processing state of the image forming unit 118. The operation mode includes an active mode, a standby mode, a first power saving mode, a second power saving mode, and a shutdown mode. When it is not necessary to distinguish the first and second power saving modes from each other, they may be referred to simply as a power saving mode. FIG. 2 is a diagram illustrating transition operation modes of the image forming apparatus 100.

The standby mode is a mode to which the shutdown mode described later transitions after the master power switch 111 is turned on. When the image forming apparatus 100 is in the standby mode, the master power switch 111 and the main unit power switch 113 are turned on, power corresponding to a predetermined potential of voltage is supplied to the controller 101, the operation panel 114, the FAX communication unit 116, the image reading unit 117, and the image forming unit 118. The image forming apparatus 100 transitions from the standby mode to the active mode when the image forming unit 118 performs image processing or the FAX communication unit 116 performs FAX communication, for example. The image forming apparatus 100 transitions from the standby mode to the first or second power saving mode when a state in which no operation is input through the operation input unit of the operation panel 114, no image processing is performed by the image forming unit 118, or no FAX communication is performed by the FAX communication unit 116 continues for a predetermined period of time or longer.

The active mode is a mode to which the standby mode transitions when processing related to formation of images is performed, for example, when the image forming unit 118 performs image processing or the FAX communication unit 116 performs FAX communication. In the active mode, since the image forming apparatus 100 performs processing related to formation of images, power consumption becomes the largest among the respective operation modes. The image forming apparatus 100 transitions from the active mode to the standby mode when the image forming apparatus 100 finishes the processing related to formation of images.

In the first power saving mode, the master power switch 111 is turned on but the main unit power switch 113 is turned off. Thus, the supply of power to the display unit of the operation panel 114, the data storage unit 115, the FAX communication unit 116, the image reading unit 117, and the image forming unit 118 as well as the main CPU circuit 104 is blocked. On the other hand, power is supplied to the operation input unit of the operation panel 114. Moreover, power is supplied to the sub-CPU peripheral circuit 105 through the AC/DC power generation unit 112 and the DC/DC power supply circuit 108, and power is supplied to the second sub-CPU 110 through the AC/DC power generation unit 112 and the DC/DC power supply circuit 109. That is, the first power saving mode is a power saving state in which power corresponding to a voltage lower than that of a normal operation mode is supplied and a state in which power consumption is smallest under a network environment where the image forming apparatus 100 is connected to a network. In the first power saving mode, the first sub-CPU 107 performs automatic response actions through a network, and the second sub-CPU 110 monitors a factor (referred to as a return factor) for returning to a different operation mode from the first power saving mode. When the return factor is detected, the image forming apparatus 100 transitions from the first power saving mode to the standby mode or the shutdown mode described later in accordance with the return factor. Although the return factor in the first power saving mode will be described later, the return factor may occur due to communication through a network.

In the second power saving mode, the master power switch 111 is turned on. Thus, the supply of power to the display unit of the operation panel 114, the data storage unit 115, the FAX communication unit 116, the image reading unit 117, and the image forming unit 118 as well as the main CPU circuit 104 and the sub-CPU peripheral circuit 105 is blocked. On the other hand, power is supplied to the operation input unit of the operation panel 114. Moreover, power is supplied to the second sub-CPU 110 through the AC/DC power generation unit 112 and the DC/DC power supply circuit 109. That is, the second power saving mode is a power saving state in which power corresponding to a voltage lower than that of a normal operation mode is supplied and a state in which power consumption is smallest under an environment where the image forming apparatus 100 is not connected to a network. In the second power saving mode, the second sub-CPU 110 monitors a factor (referred to as a return factor) for returning to a different operation mode from the second power saving mode. When the return factor is detected, the image forming apparatus 100 transitions from the second power saving mode to the standby mode or the shutdown mode described later in accordance with the return factor. Although the return factor in the second power saving mode will also be described later, the return factor may not occur due to communication through a network unlike the first power saving mode.

The shutdown mode is a mode to which the image forming apparatus 100 transitions when the master power switch 111 is turned off. In the shutdown mode, the supply of power to the controller 101, the operation panel 114, the FAX communication unit 116, the image reading unit 117, and the image forming unit 118 is blocked. The image forming apparatus 100 transitions from the shutdown mode to the standby mode described above when the master power switch 111 is turned on.

Figure 3:
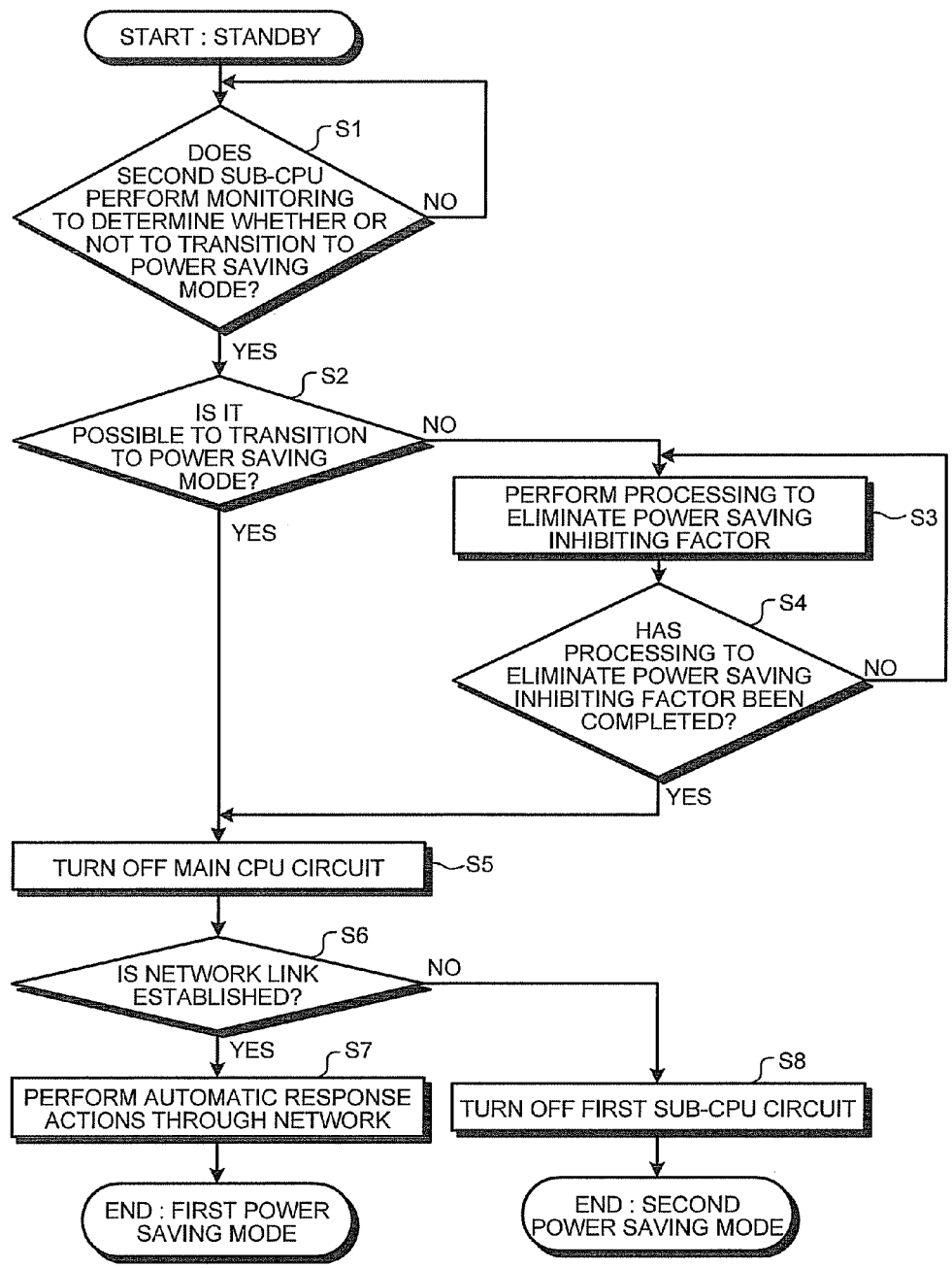
FIG. 3 is a flowchart illustrating the flow of processes performed by a second sub-CPU when the operation mode of the image forming apparatus transitions from a standby mode to a first power saving mode or a second power saving mode.

Next, the flow of processes performed by the image forming apparatus 100 according to this embodiment will be described. In this example, the flow of processes performed by the second sub-CPU 110 when the operation mode of the image forming apparatus 100 transitions from the standby mode to the first or second power saving mode will be described with reference to FIG. 3. When the image forming apparatus 100 is in the standby mode in which the master power switch 111 and the main unit power switch 113 of the image forming apparatus 100 are turned on, power corresponding to a predetermined potential of voltage is supplied to the controller 101, the operation panel 114, the FAX communication unit 116, the image reading unit 117, and the image forming unit 118, and the image forming apparatus 100 performs standby for execution of processing related to formation of images, the second sub-CPU 110 determines periodically or at an optional point of time whether or not to transition the operation mode of the image forming apparatus 100 to the power saving mode (step S1). The conditions for transitioning to the power saving mode include, for example, when an operation for instructing the transition to the power saving mode is input from the user through the operation input unit of the operation panel 114, or when a state in which no operation is input through the operation input unit of the operation panel 114 or no FAX communication is performed by the FAX communication unit 116 continues for a predetermined period of time or longer. When the second sub-CPU 110 determines to transition to the power saving mode (YES in step S1), the second sub-CPU 110 causes the main CPU 103 to determine whether or not the image forming apparatus 100 can transition to the power saving mode (step S2). Whether it is possible to transition to the power saving mode is determined by determining whether there is a factor (referred to as a power saving inhibiting factor) that inhibits the transition to the power saving mode. The power saving inhibiting factor is, for example, writing of data to the data storage unit 115, maintenance processing of the image forming apparatus 100, suspend-to-RAM (STR) processing of the main memory 102 connected to the main CPU 103.

When such a power saving inhibiting factor is present, the second sub-CPU 110 determines that it is not possible to transition to the power saving mode (NO in step S2). The main CPU 103 performs processing so as to eliminate the power saving inhibiting factor, and when the power saving inhibiting factor is eliminated (YES in step S4), a state where it is possible to transition to the power saving mode is achieved. For example, when the power saving inhibiting factor is writing of data to the data storage unit 115, the main CPU 103 completes the writing of data to the data storage unit 115 to achieve a state where it is possible to transition to the power saving mode. When the power saving inhibiting factor is maintenance processing of the image forming apparatus 100, the main CPU 103 completes the maintenance processing to achieve a state where it is possible to transition to the power saving mode. When the power saving inhibiting factor is STR processing of the main memory 102, the main CPU 103 completes the STR processing to achieve a state where it is possible to transition to the power saving mode. When the state where it is possible to transition to the power saving mode is achieved (YES in steps S2 and S4), the second sub-CPU 110 blocks the supply of power to the main CPU circuit 104 (step S5). Moreover, the second sub-CPU 110 turns off the main unit power switch 113 to block the supply of power to the operation input unit of the operation panel 114, the data storage unit 115, the FAX communication unit 116, the image reading unit 117, and the image forming unit 118.

Subsequently, the second sub-CPU 110 causes the first sub-CPU 107 to determine whether the image forming apparatus 100 is connected to a network (step S6). As described above, this determination is performed based on the result of detection by the first sub-CPU 107 checking the state of the link status register of the Ethernet physical layer 106. When it is determined that the image forming apparatus 100 is connected to the network (YES in step S6), the second sub-CPU 110 does not block the supply of power to the sub-CPU peripheral circuit 105. In this case, the image forming apparatus 100 is in the first power saving mode. In the image forming apparatus 100 in the first power saving mode, the first sub-CPU 107 performs automatic response actions through the network (step S7). Specifically, upon receiving response request data requesting a response through the network and the Ethernet physical layer 106, the first sub-CPU 107 sends response data representing a response through the network and the Ethernet physical layer 106.

Moreover, the second sub-CPU 110 monitors a return factor to determine whether the main CPU 103 needs to perform response actions, the first sub-CPU 107 can perform response actions, and it is okay to maintain the first power saving mode. The return factor occurs, for example, when an operation is input through the operation input unit of the operation panel 114, the sub-CPU peripheral circuit 105 has received print data instructing printing through the network, or the master power switch 111 is turned off. For example, when the sub-CPU peripheral circuit 105 has received the response request data through the network, the second sub-CPU 110 determines that the main CPU 103 does not need to perform response actions, the first sub-CPU 107 can perform response actions, and it is okay to maintain the first power saving mode. When the sub-CPU peripheral circuit 105 has received the print data through the network, the second sub-CPU 110 determines that the main CPU 103 needs to perform response actions, and it is necessary to transition to the active mode through the standby mode. Moreover, similarly, when an operation instructing copying is input through the operation input unit of the operation panel 114 or an operation instructing FAX communication is input, the second sub-CPU 110 also determines that the main CPU 103 needs to perform response actions, and it is necessary to transition to the active mode through the standby mode. When the master power switch 111 is turned off, the second sub-CPU 110 determines to transition to the shutdown mode. Moreover, the second sub-CPU 110 transitions the operation mode of the image forming apparatus 100 to the standby mode or the shutdown mode in accordance with the determination result.

On the other hand, when it is determined that the image forming apparatus 100 is not connected to the network (NO in step S6), the second sub-CPU 110 blocks the supply of power to the sub-CPU peripheral circuit 105 (step S8). In this case, the image forming apparatus 100 is in the second power saving mode. In the image forming apparatus 100 in the second power saving mode, the second sub-CPU 110 monitors a return factor and determines whether the main CPU 103 needs to perform response actions. The return factor in the second power saving mode occurs when an operation is input through the operation input unit of the operation panel 114 or the master power switch 111 is turned off. That is, in the second power saving mode, it is not possible to receive print data through the network and to perform automatic response actions through the network unlike the first power saving mode. Moreover, when an operation instructing copying is input through the operation input unit of the operation panel 114 or an operation instructing FAX communication is input, the second sub-CPU 110 also determines that the main CPU 103 needs to perform response actions, and it is necessary to transition to the active mode through the standby mode. When the master power switch 111 is turned off, the second sub-CPU 110 determines to transition to the shutdown mode. Moreover, the second sub-CPU 110 transitions the operation mode of the image forming apparatus 100 to the standby mode or the shutdown mode in accordance with the determination result.

As described above, in this embodiment, the second sub-CPU 110 that detects a return factor for returning to a different operation mode from the power saving mode, and the sub-CPU peripheral circuit 105 that performs automatic response actions through the network are provided separate from each other, so that power supply systems that supplies power to them are independently provided. Moreover, the second sub-CPU 110 determines whether the image forming apparatus 100 is connected to the network. When the image forming apparatus 100 is connected to the network, the second sub-CPU 110 supplies power to the sub-CPU peripheral circuit 105 that performs automatic response actions through the network and it causes the operation mode of the image forming apparatus 100 to transition to the first power saving mode. When the image forming apparatus 100 is not connected to the network, the second sub-CPU 110 blocks the supply of power to the sub-CPU peripheral circuit 105 and causes the operation mode of the image forming apparatus 100 to transition to the second power saving mode. In the second power saving mode, power consumption becomes smaller than that of the first power saving mode. Thus, by finely regulating the power state of the image forming apparatus 100 in such a way, the power consumption of the image forming apparatus 100 being in the power saving mode can be decreased more effectively.

In the above example, the image forming apparatus 100 has been described to include a configuration for connecting to a network and to be either in a state of being connected to the network or in a state of not being connected to the network. However, the image forming apparatus 100 may not include a configuration for connecting to the network and may be always in a state of not being connected to the network. Moreover, the image forming apparatus 100 is not limited to a MFP capable of realizing a copy function, a printer function, a scanner function, and a FAX communication function but may be one capable of realizing at least one of these functions. For example, the image forming apparatus 100 according to the present embodiment may be applied to any one of a copying machine that realizes the copy function, a printer that realizes the printer function, a scanner device that realizes the scanner function, a FAX machine that realizes the FAX function.

For example, even if the image forming apparatus 100 is configured to be unable to connect to a network and is a copying machine that realizes the copy function or an image forming apparatus that realizes the copy function and the FAX communication function, it is possible to decrease power consumption by transitioning the operation mode of the image forming apparatus 100 to the second power saving mode in accordance with the determination of the second sub-CPU 110 as described above. That is, the configuration according to this embodiment can be applied to a series of products of image forming apparatuses in which the same control substrate as that of the controller 101 is mounted. In other words, regardless of whether the image forming apparatus 100 uses a function of connecting to a network, it is possible to minimize power consumption of the control substrate by changing variation (control by execution of various kinds of programs) of internal control of the controller 101 of the image forming apparatus 100.

Modified Example

The present invention is not limited to the above embodiment, but can be embodied by modifying the constituent elements thereof with a range without departing from the spirit thereof in its implementation step. Moreover, various inventions can be realized by an appropriate combination of a plurality of constituent elements disclosed in the above embodiment. For example, several constituent elements may be removed from all constituent elements shown in the embodiment. Furthermore, constituent elements of different embodiments may be appropriately combined with each other. Moreover, various modifications as shown below are possible.

In the above-described embodiment, various kinds of programs executed by the image forming apparatus 100 may be stored on a computer connected to a network such as the Internet and provided by being downloaded through a network. In addition, the programs may be recorded in a computer-readable recording medium, such as a CD-ROM, a flexible disk (FD), a CD-R, or a digital versatile disk (DVD), as files in an installable format or an executable format and provided as the computer-readable recording medium.

In the above-described embodiment, the second sub-CPU 110 of the image forming apparatus 100 may determine whether the connection of the image forming apparatus 100 to the network is valid as the state of the image forming apparatus 100 with regard to connection to the network when causing the operation mode of the image forming apparatus 100 to transition from the standby mode to the power saving mode. In this case, network connection setting information representing whether the connection of the image forming apparatus 100 to the network is valid or not may be stored in advance in the nonvolatile memory 120. The second sub-CPU 110 determines whether the connection of the image forming apparatus 100 to the network is valid or not using the network connection setting information stored in the nonvolatile memory 120 when causing the operation mode of the image forming apparatus 100 to transition from the standby mode to the power saving mode. Then, the second sub-CPU 110 transitions the operation mode to either the first power saving mode or the second power saving mode in accordance with the determination result.

FIG. 4 is a flowchart illustrating the flow of processes performed by the second sub-CPU 110 according to the modified example when the operation mode of the image forming apparatus 100 transitions from the standby mode to the first power saving mode or the second power saving mode. Processes of steps S1 to S5 are the same as those of the embodiment described above. In step S10, the second sub-CPU 110 reads the network connection setting information stored in the nonvolatile memory 120. In step S11, the second sub-CPU 110 determines whether the connection of the image forming apparatus 100 to the network is valid or not using the network connection setting information. When the second sub-CPU 110 determines that the connection of the image forming apparatus 100 to the network is valid (YES in step S11), the second sub-CPU 110 does not block the supply of power to the sub-CPU peripheral circuit 105. In this case, the image forming apparatus 100 is in the first power saving mode. In this way, when the connection to the network is valid, even if the image forming apparatus 100 is not actually connected to the network, the first power saving mode is set to the image forming apparatus 100. In this state, when the user connects network cables to the image forming apparatus 100, unless a return factor is detected, the image forming apparatus 100 is connected to the network with no change in the state in which the supply of power to the main CPU circuit 104, the operation input unit of the operation panel 114, the data storage unit 115, the FAX communication unit 116, the image reading unit 117, and the image forming unit 118 is blocked. That is, power consumption under the network environment is minimized. On the other hand, when the second sub-CPU 110 determines that the connection of the image forming apparatus 100 to the network is not valid (NO in step S11), the flow proceeds to step S8. The process of step S8 is the same as that of the above-described embodiment.

According to the above configuration, for example, when it is not possible to make the function of connecting to the network valid due to shipment configuration of the image forming apparatus 100 as a product, it is possible to decrease the number of processing steps up to when the operation mode of the image forming apparatus 100 transitions to the power saving mode and to allow the image forming apparatus 100 to quickly transition to the power saving mode. As a result, it is possible to effectively decrease the power consumption of the image forming apparatus 100. Moreover, by storing the network connection setting information in the nonvolatile memory 120, the image forming apparatus 100 can continuously hold the network connection setting information even when the master power switch 111 is turned off. Moreover, it is possible to always make the determination using the network connection setting information when causing the operation mode of the image forming apparatus 100 to transition to the power saving mode.

According to the embodiments, it is possible to reduce power consumption of an image forming apparatus more effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   a power supply circuit that receives power from a power supply and supplies the power to a plurality of loads, the loads including at least a main control unit that controls a main body of an image forming apparatus and a first sub-control unit that performs response action through a network when the supply of power to the main control unit is blocked and the image forming apparatus is connected to the network; and
   a second sub-control unit that controls the blocking of the supply of power to the main control unit, wherein
   the second sub-control unit includes
      a first determination unit that determines whether or not to block the supply of power from the power supply circuit to the main control unit using a predetermined condition;
      a second determination unit that determines a state of the image forming apparatus with regard to connection to the network when the first determination unit determines to block the supply of power from the power supply circuit to the main control unit;
      a power control unit that blocks the supply of power from the power supply circuit to the first sub-control unit in accordance with the determination result by the second determination unit; and
      a detection unit that detects at least one of a factor for resuming the supply of power from the power supply circuit to the main control unit and a factor for blocking the supply of power from the power supply circuit to all or a part of the loads of the image forming apparatus.

2. The control device according to claim 1, wherein the power control unit does not block the supply of power from the power supply circuit to the first sub-control unit when the second determination unit determines that the image forming apparatus is connected to the network.

3. The control device according to claim 1, wherein the power control unit blocks the supply of power from the power supply circuit to the first sub-control unit when the second determination unit determines that the image forming apparatus is not connected to the network.

4. The control device according to claim 1, further comprising a nonvolatile storage unit that stores therein network connection setting information representing whether the connection of the image forming apparatus to the network is valid or not.

5. The control device according to claim 4, wherein
   the storage unit is connected to the second sub-control unit,
   the second determination unit determines whether the connection of the image forming apparatus to the network is valid or not using the network connection setting information stored in the storage unit, and
   the power control unit does not block the supply of power from the power supply circuit to the first sub-control unit when the second determination unit determines that the connection of the image forming apparatus to the network is valid.

6. The control device according to claim 5, wherein
   when the network connection setting information represents that the connection of the image forming apparatus to the network is valid, the second determination unit determines that the connection of the image forming apparatus to the network is valid even though the image forming apparatus is not in connection with the network.

7. An image forming apparatus comprising:
   a main control unit that controls a main body of the image forming apparatus;
   a first sub-control unit that performs response action through a network when the supply of power to the main control unit is blocked and the image forming apparatus is connected to the network;
   an image forming unit that forms an image on a print medium using image data representing an image;

a power supply circuit that receives power from a power supply and supplies the power to a plurality of loads including at least the main control unit, the first sub-control unit, and the image forming unit; and a second sub-control unit that controls the blocking of the supply of power to the main control unit, wherein the second sub-control unit includes a first determination unit that determines whether or not to block the supply of power from the power supply circuit to the main control unit using predetermined conditions;

a second determination unit that determines a state of the image forming apparatus in regard to connection to the network when the first determination unit determines to block the supply of power from the power supply circuit to the main control unit;

a power control unit that blocks the supply of power from the power supply circuit to the first sub-control unit in accordance with the determination result by the second determination unit; and a detection unit that detects at least one of a factor for resuming the supply of power from the power supply circuit to the main control unit and a factor for blocking the supply of power from the power supply circuit to all or a part of the loads of the image forming apparatus.

8. A control method executed by a control device including: a power supply circuit that receives power from a power supply and supplies power to a plurality of loads, the loads including at least a main control unit that controls a main body of an image forming apparatus and a first sub-control unit that performs response action through a network when the supply of power to the main control unit is blocked, and the image forming apparatus is connected to the network; and a second sub-control unit that controls the blocking of the supply of power to the main control unit, the control method comprising:

determining, by the second-sub control unit, whether or not to block the supply of power from the power supply circuit to the main control unit using predetermined conditions;

determining, by the second-sub control unit, a state of the image forming apparatus with regard to connection to the network when it is determined to block the supply of power from the power supply circuit to the main control unit, in the determining of whether or not to block the supply;

by the second sub-control unit, blocking, the supply of power from the power supply circuit to the first sub-control unit in accordance with the determination result in the determining the state of the image forming apparatus; and detecting, by the second sub-control unit, at least one of a factor for resuming the supply of power from the power supply circuit to the main control unit and a factor for blocking the supply of power from the power supply circuit to all or a part of the loads of the image forming apparatus.

* * * * *